United States Patent [19]

Kamiya

[11] Patent Number: 5,083,115
[45] Date of Patent: Jan. 21, 1992

[54] LIQUID-LEVEL DETECTING STRUCTURE
[75] Inventor: Atsushi Kamiya, Toyohashi, Japan
[73] Assignee: Asmo Co., Ltd., Shizuoka, Japan
[21] Appl. No.: 641,691
[22] Filed: Jan. 16, 1991
[30] Foreign Application Priority Data
  Jan. 17, 1990 [JP] Japan .................. 2-2944[U]
[51] Int. Cl.$^5$ ............................ G01F 23/74
[52] U.S. Cl. .................. 340/624; 73/DIG. 5; 73/319
[58] Field of Search ............. 73/305, 319, DIG. 5; 340/623, 624

[56] References Cited

U.S. PATENT DOCUMENTS

| 1,150,122 | 8/1915 | Jeavons | 73/319 |
|---|---|---|---|
| 2,102,615 | 12/1937 | Cubete | 73/319 |
| 2,371,511 | 3/1945 | Faus | 73/319 |
| 2,479,503 | 8/1949 | Moore | 340/623 |
| 2,613,294 | 10/1952 | McNea | 340/623 |
| 3,010,319 | 11/1961 | Sontheimer | 73/305 |
| 3,246,517 | 4/1966 | Malkiewicz | 340/623 |
| 3,258,968 | 7/1966 | Woodcock | 340/623 |
| 4,001,802 | 1/1977 | Fales | 340/624 |
| 4,610,165 | 9/1986 | Duffy et al. | 73/305 |
| 4,702,107 | 10/1987 | Guerrini et al. | 73/319 |
| 4,748,300 | 5/1988 | Anderson | 340/624 |
| 4,771,272 | 9/1988 | Barnes | 340/624 |
| 4,833,441 | 5/1989 | Okada et al. | 340/624 |
| 4,890,493 | 1/1990 | Johnson et al. | 73/319 |

FOREIGN PATENT DOCUMENTS

| 3429702 | 2/1986 | Fed. Rep. of Germany | 73/305 |
|---|---|---|---|
| 0051621 | 5/1981 | Japan | 73/305 |
| 0214621 | 9/1988 | Japan | 73/305 |
| 0451134 | 7/1936 | United Kingdom | 73/305 |
| 1078270 | 8/1967 | United Kingdom | 73/319 |

Primary Examiner—William A. Cuchlinski, Jr.
Assistant Examiner—Diego F. F. Gutierrez
Attorney, Agent, or Firm—Venable, Baetjer, Howard & Civiletti

[57] ABSTRACT

A liquid-level detecting structure includes a housing disposed in a tank in proximity to a wall surface of the tank, a float disposed inside the housing and adapted to be moved by the liquid which has entered the housing, and a passage provided for introducing the liquid into the housing and having an opening facing the wall surface of the tank. When acceleration has acted toward the wall surface of the tank with the liquid level being close to a minimum level, the liquid is biased toward the wall surface. Accordingly, the opening of the passage is immersed in the liquid, preventing the float from being further lowered. Meanwhile, when acceleration has acted toward a wall surface opposite to the adjacent wall surface, this acceleration is oriented in an opposite direction to the direction in which the liquid flows out of the opening of the passage, so that the liquid in the housing is prevented from flowing out of the passage.

18 Claims, 9 Drawing Sheets

LIQUID-LEVEL DETECTING STRUCTURE

BACKGROUND OF THE INVENTION

1. Field of the Invention

The present invention relates to a liquid-level detecting structure for detecting a minium level of a liquid accommodated in a tank such as a washer tank.

2. Description of the Related Art

A level warning switch for detecting a remaining amount (minimum level) of a liquid accommodated in a tank (such as a washer in a washer tank and a radiator liquid) is known.

In a conventional level warning switch, a float which moves vertically due to a change in the liquid level is disposed in a cylindrical case. A magnet is secured to a lower surface of the float, and a reed switch is disposed at a lower portion of the case in facing relationship with the magnet. The arrangement provided is such that as the float moves downward due to the change in the liquid level and the magnet is consequently brought to a predetermined position close to the reed switch, the reed switch is turned on for detecting the minimum liquid level, which in turn causes a warning lamp to light up.

With such a conventional level warning switch, when the remaining amount of the liquid in the tank is close to the minimum level and a large acceleration G is produced due to a sudden acceleration or deceleration of a vehicle or high-speed turning thereof, the liquid in the tank moves and the liquid level is inclined. Consequently, the float moves together with the liquid level, causing abnormal turning on and off (so-called chattering) of the reed switch. This causes, for instance, a "flickering" of the warning lamp wherein the warning lamp repeatedly turns on and off within a short time. Accordingly, it has been impossible with the conventional arrangement to sufficiently demonstrate the essential function of giving a warning to the vehicle occupant.

Accordingly, in order to overcome this drawback, a measure, among others, has been adopted in which a timer is provided in a detection circuit of a level warning switch, such that a temporary change in the liquid level, when detected by the level warning switch, is corrected by a control circuit, thereby eliminating the misalarming of the warning lamp, i.e., the so-called "flickering" of the warning lamp in which the turning on and off of the lamp is repeated.

With such a conventional measure, however, the production cost of the level warning system has been inevitably high due to the detection circuit and the like using a timer.

SUMMARY OF THE INVENTION

Accordingly, an object of the present invention is to provide a liquid-level detecting structure which accurately ascertains a remaining amount (minimum level) of a liquid and does not cause "chattering" and "flickering" even in cases where the structure is used in a tank having a special configuration or in a vehicle which turns at high speed or moves vehemently, thereby overcoming the above-described drawback of the conventional art.

To this end, in accordance with one aspect of the present invention, there is provided a liquid-level detecting structure for detecting a minimum level of a liquid accommodated in a tank, comprising: a housing disposed in the tank in proximity to a wall surface of the tank; a float disposed inside the housing and adapted to be moved by the liquid which has entered the housing; and a passage provided for introducing the liquid into the housing and having an opening facing the wall surface of the tank.

In accordance with the above-described arrangement, the float is lowered with a drop in the liquid level in the tank. When the float is lowered to a predetermined position, a minimum liquid level is detected.

When acceleration occurs in the direction of the wall surface of the tank with the liquid level being close to the minimum level, the liquid is biased toward the wall surface. Accordingly, the opening of the passage is immersed in the liquid, preventing the float from being further lowered. Meanwhile, when acceleration occurs in an opposite direction, i.e., toward a wall surface opposite to the adjacent wall surface, this acceleration is oriented in an opposite direction to the direction in which the liquid flows out of the opening of the passage, so that the liquid in the housing is prevented from flowing out of the passage. Thus, the liquid in the housing is prevented from flowing into or out of the passage.

In accordance with another aspect of the present invention, there is provided a liquid-level detecting structure for detecting a minimum level of a liquid accommodated in a tank, comprising: a housing disposed in the tank; a float disposed inside the housing and adapted to be moved by the liquid which has entered the housing, wherein the housing is mounted in proximity to a portion of an inner periphery of a side wall of the tank, and a side wall member is disposed around an outer peripheral wall surface of the housing so as to form a liquid holding portion for holding the liquid between the same and the outer peripheral surface of the housing. In addition, a first communicating passage is provided in the housing to allow the inside of the housing to communicate with the liquid holding portion, while a second communicating passage is provided at a portion of the side wall member corresponding to the inner periphery of the side wall of the tank so as to allow the liquid holding portion to communicate with the outside.

With the liquid-level detecting structure having the above-described arrangement, the float moves downward inside the housing with a drop in the liquid level inside the tank, and when it reaches a predetermined position, the minimum liquid level is detected.

Here, in a case where the remaining amount of the liquid in the tank is close to the minimum liquid level and a large acceleration G has occurred due to a sharp acceleration or deceleration of the vehicle or high-speed turning thereof, the liquid level in the tank is inclined.

In this case, when the acceleration in a direction toward the inner periphery of the side wall of the tank located in proximity to the housing, the liquid moves in a biased manner toward this side wall, and the liquid level becomes inclined. As a result, the liquid level is located upwardly of the first communicating passage of the housing and the second communicating passage of the side wall member (in other words, the first and second communicating holes still remain immersed in the liquid). Accordingly, the liquid remains in the liquid holding portion formed by the side wall member and in the housing, the float is prevented from moving downward. Hence, the reed switch which is disposed below the housing and is turned on and off due to the vertical movement of the float is prevented from being actuated unduly, so that "chattering" and "flickering" are prevented from occurring.

Meanwhile, in a case where acceleration occurs in a direction toward an inner periphery of a side wall spaced apart from the housing, the liquid moves in a biased manner toward this side wall, and the liquid level becomes inclined in an opposite direction to the above-described direction. As a result, the liquid level is located downwardly of the first communicating passage of the housing and the second communicating passage of the side wall member (in other words, the first and second communicating passages are exposed from the liquid). In this case, however, since the acceleration occurs in an opposite direction to the direction in which the liquid flows out from the liquid holding portion formed by the side wall member through the second communicating passage, the liquid is prevented from leaking to the outside from the liquid holding portion. As a result, the liquid remains in the housing communicating with the liquid holding member by virtue of the first communicating passage, so that the float is prevented from moving downward and is held in the housing as it is. In this case as well, the reed switch which is provided below the housing and is turned on and off due to the vertical movement of the float is prevented from being actuated unduly, so that "chattering" and "flickering" are prevented from occurring.

Thus, it is possible to accurately ascertain the remaining amount (minimum liquid level) of the liquid by means of the level warning switch alone, and a detection circuit and the like using a timer can be dispensed with, thereby making it possible to reduce production cost. In addition, the liquid-level detecting structure in accordance with the present invention can be applied even to a tank having a special configuration or a vehicle which undergoes vehement movement.

As described above, the liquid-level detecting structure in accordance with the present invention offers an advantage in that even in cases where the structure is used in a tank having a special configuration or in a vehicle which turns at high speed or moves vehemently, it is possible to accurately ascertain the remaining amount of the liquid, and "chattering" and "flickering" are prevented from occurring.

The above and other objects, features and advantages of the present invention will become more apparent from the following detailed description of the invention when read in conjunction with the accompanying drawings.

DESCRIPTION OF THE PREFERRED EMBODIMENTS

Figure 1:
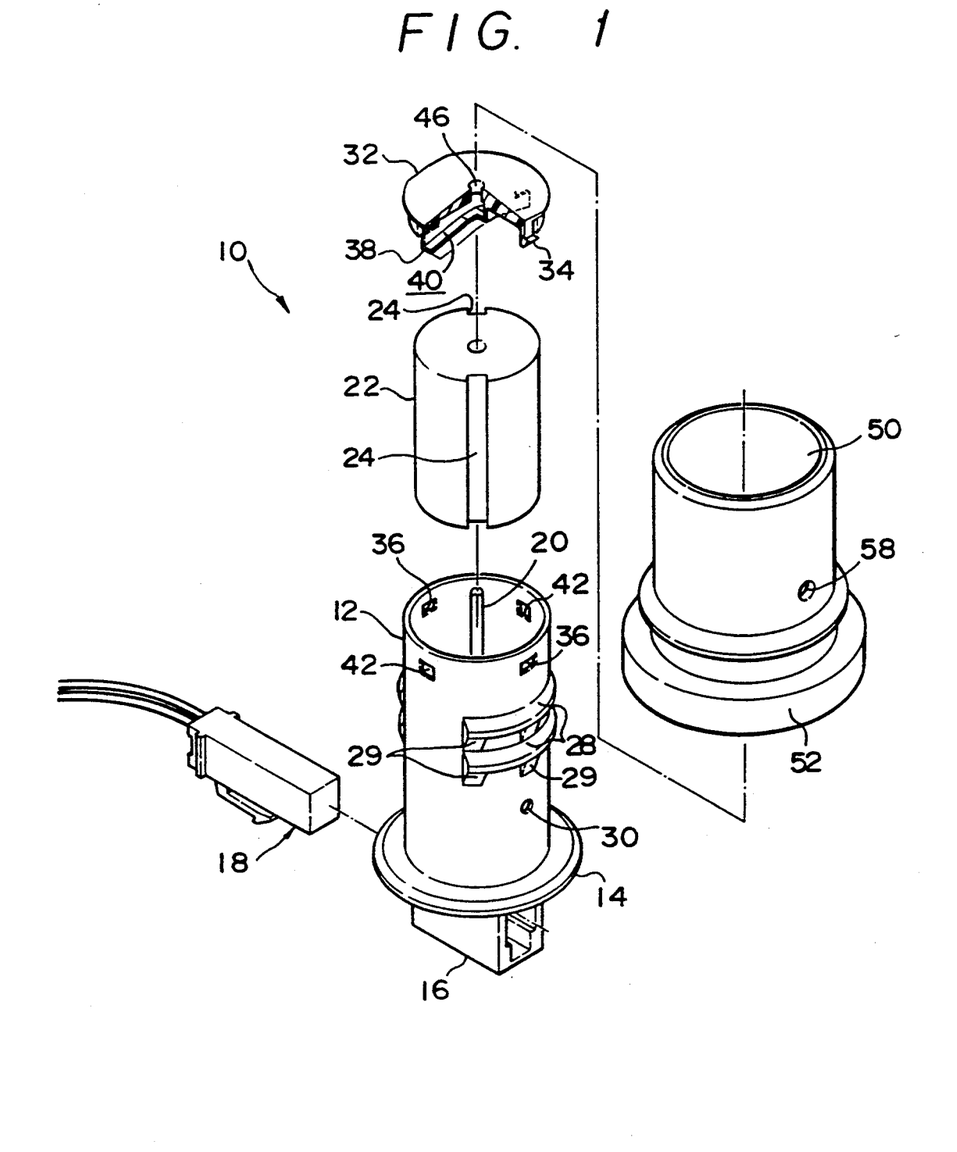
FIG. 1 is an exploded perspective view of a level warning switch according to the present invention.
Figure 4:
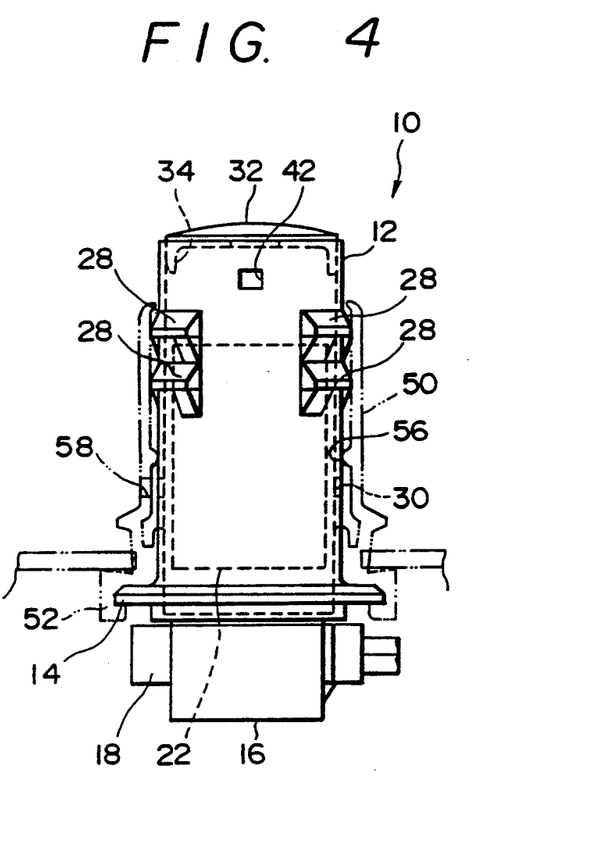
FIG. 4 is a front elevational view illustrating the appearance of a level warning switch.
Figure 5:
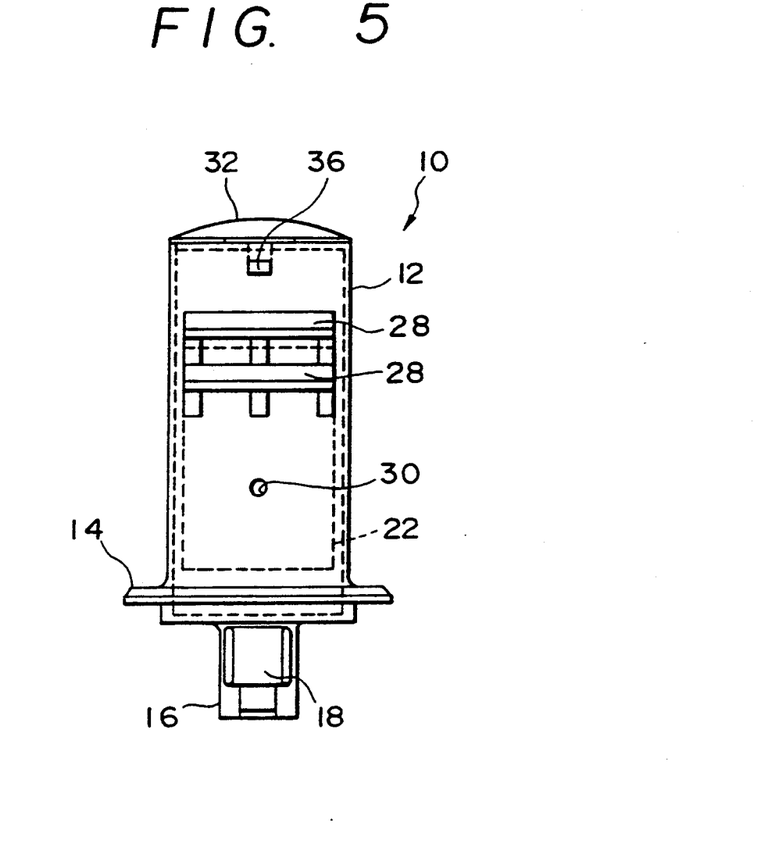
FIG. 5 is a side elevational view illustrating the appearance of the level warning switch.
Figure 6:
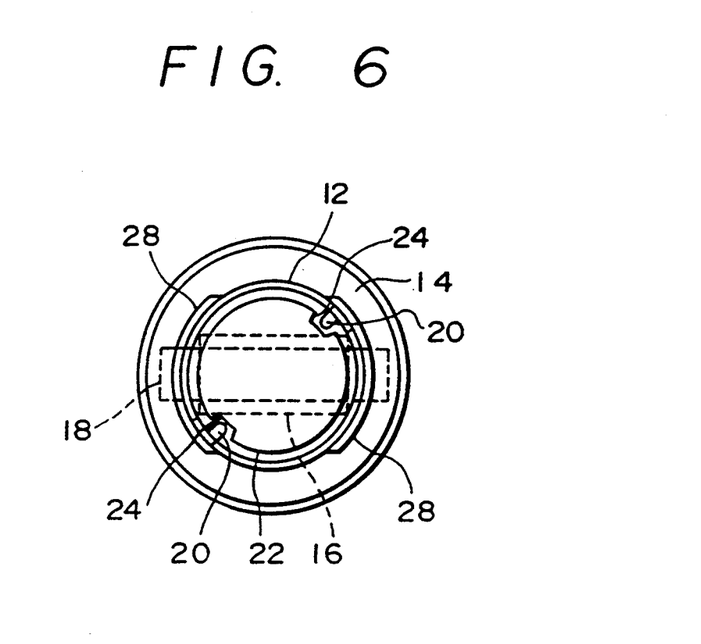
FIG. 6 is a plan view of the level warning switch with a cap removed.

FIG. 1 illustrates an exploded perspective view of a level warning switch 10 in accordance with the present invention. FIGS. 4 to 6 illustrate a front elevational view, a side elevational view, and a plan view with some components omitted, of the level warning switch 10.

The level warning switch 10 has a case 12 serving as a main body member. The case 12 is made of a synthetic resin and is formed into a substantially cylindrical configuration with a flange 14 being formed at a lower end thereof. A receiving portion 16 having a U-shaped cross section is formed underneath the flange 14 for receipt of a reed switch 18. The reed switch 18 is so arranged that a built-in magnetic reed (not illustrated) is actuated by a magnetic force to effect an on/off operation.

A pair of protrusions 20 are formed on an inner peripheral wall surface of the case 12 at opposing positions. The protrusions 20 extend in an axial direction of the case 12. In addition, a float 22 is disposed in the case 12.

The float 22 is a substantially cylindrical floating member. A pair of grooves 24 formed in an outer periphery thereof, extend in an axial direction corresponding to the protrusions 20 of the case 12. The protrusions 20 of the case 12 are adapted to be fitted in these grooves 24 such that the float 22 is guided by the protrusions 20 and is accommodated in the case 12 so as to be movable in the axial direction only. A magnet 26 is secured to a bottom portion of the float 22 (illustrated in FIGS. 2 and 3) so that when the float 22 approaches the bottom portion of the case 12, the reed switch 18 may be actuated by the magnetic force of the magnet 26.

Protrusions 28 are formed on an outer periphery of the side wall of the case 12. The cross section each of the protrusion 28 has a wedge-shaped configuration as viewed in a direction orthogonal to the longitudinal axis of the protrusion. Each protrusion also has an arcuate configuration in the circumferential direction of the case 12. Ribs 29 are formed on a lower portion of each of the protrusions 28 at predetermined intervals. These protrusions 28 and ribs 29 are respectively provided in two rows in a horizontal direction as viewed in FIG. 1, and serve as a stopper for the level warning switch 10 in a low-temperature state which will be described later.

A through-hole 30 serving as a first communicating passage is provided in the side wall of the case 12 at a position below these protrusions 28 and allows the inside of the case to communicate with the outside thereof.

Meanwhile, a cap 32 is provided on an upper end of the case 12. The cap 32 is also made of a synthetic resin as in the case of the case 12, and is formed into a disk-shaped configuration as a whole. A pair of pawls 34 are formed on a lower peripheral portion of the cap 32 at opposing positions thereof. These pawls 34 correspond to retaining holes 36 provided in an upper end portion of the case 12. The cap is adapted to be secured to the case 12 as the pawls 34 are fitted in the retaining holes 36.

A trough portion 38 is formed projectingly on the rear surface of the cap 32. As shown in detail in FIG. 7, the cross section of the trough portion 38 has a U-shaped configuration as viewed in a direction orthogonal to the longitudinal axis thereof. The through portion extends diametrically on the lower surface of the cap 32 with the leg portions of the U-shaped configuration being secured to the cap 32. As a result, the trough portion 38 forms a liquid guide passage 40 between the same and the cap 32. A bottom wall 38A of the trough portion 38 is formed so as to gradually incline downward on longitudinally opposite sides of a central portion of the cap 32 toward the outer periphery thereof. Openings provided at opposite ends of the trough portion 38 respectively correspond to a pair of communicating holes 42 formed in the vicinity of an upper end portion of the side wall of the case 12. Accordingly, when the cap 32 is secured to the case 12, the liquid guide passage 40 communicates with the outside of the case 12 via the communicating holes 42.

Figure 7:
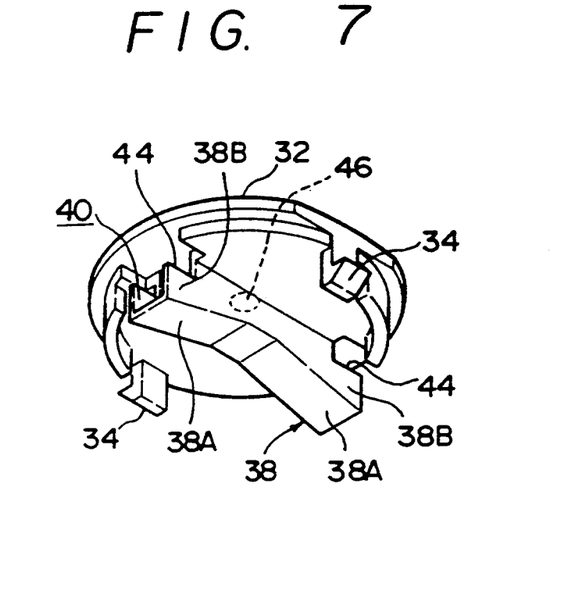
FIG. 7 is a perspective view illustrating a rear side of the cap.

A rectangular notch 44 is formed in the respective opposite ends of side walls 38B of the trough portion 38, whereby the liquid guide passage 40 communicates with the inside of the case 12.

In addition, a through-hole 46 is provided in a central portion of the cap 32, with the result that the liquid guide passage 40 communicates with the outside of the cap 32 via the through-hole 46.

A grommet 50 serving as a side wall member is fitted around the case 12 with the cap secured thereto. The grommet is made of rubber and is formed into a substantially cylindrical configuration whose inside diameter is slightly larger that the outside diameter of the case 12. An annular receiving portion 52 having a U-shaped cross section corresponding to the flange 14 of the case 12 is formed at a lower end of the grommet 50. With the flange 14 fitted in this receiving portion 52, the grommet 50 is secured to the case 12. In addition, as shown in detail in FIG. 3, with the grommet 50 secured to the case 12, a liquid holding portion 54 is formed between the case 12 and the grommet 50. An annular projection 56 is formed at an upper end of the grommet 50 so as to project inwardly and abut against the side wall of the case 12 thus positively forming the liquid holding portion 54. Furthermore, a through-hole 58 serving as a second communicating passage is provided in the side wall of the grommet 50. Consequently, the liquid holding portion 54 communicates with the outside via the through-hole 58.

Figure 8:
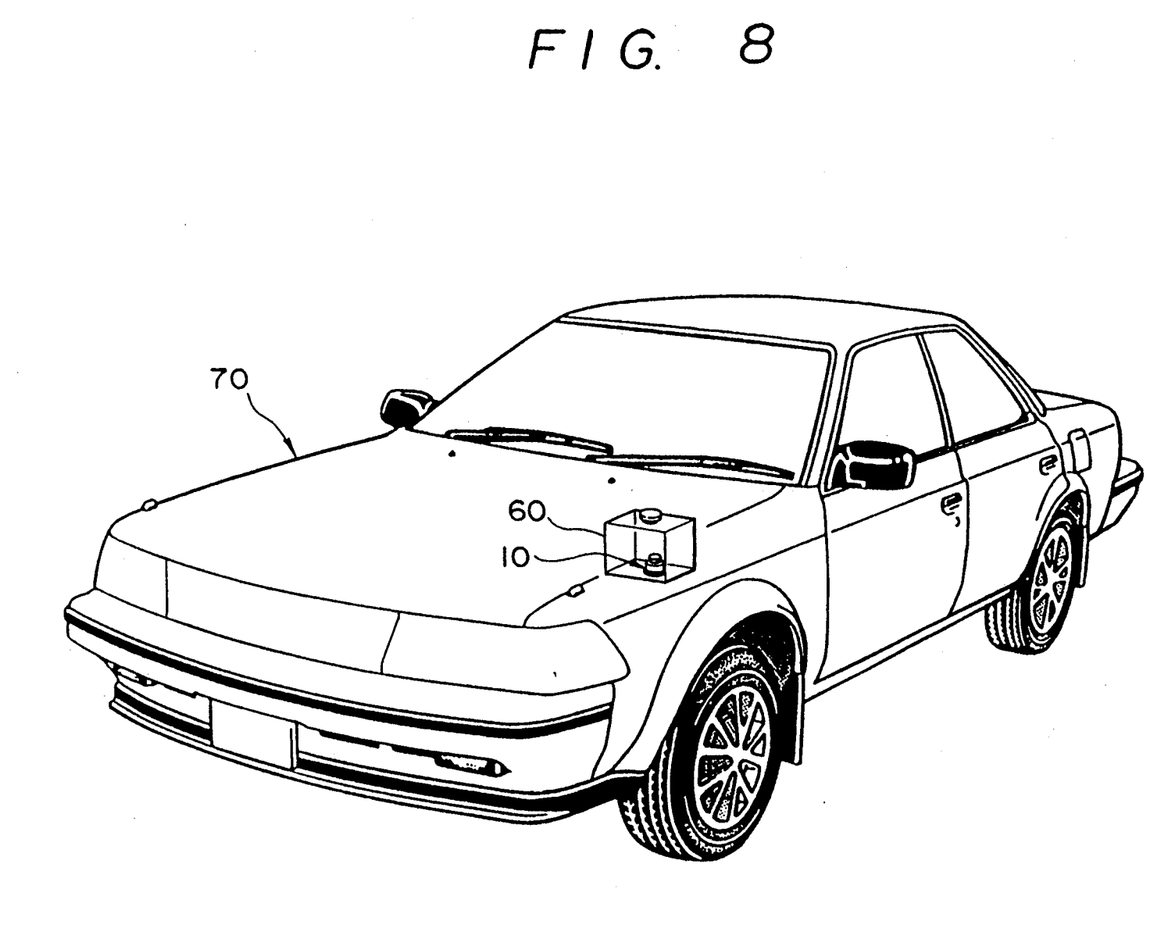
FIG. 8 is a schematic perspective view of the level warning switch and a washer tank arranged in a vehicle.

The level warning switch 10 having the above-described arrangement is mounted in a washer tank 60 disposed in an engine room of a vehicle 70, as shown in FIG. 8. Here, in the washer tank 60, the level warning switch 10 is mounted in such a manner as to be close to an inner surface of a side wall 62 of the washer tank 60 and in a state in which the through-hole 58 of the grommet 50 is opposed to the inner surface of the side wall 62.

A description will now be given of the operation of this embodiment.

When the liquid is accommodated in the washer tank 60 with the liquid level higher than the level warning switch 10, the level warning switch 10 is immersed in the liquid. The liquid flows into the liquid holding portion 54 via the through-hole 58, as well as into the case 12 through the through-holes 46 and 30. Consequently, the float floats up to a maximum level inside the case 12 with the magnet 26 spaced apart from the bottom of the case 12 and the reed switch 18 off.

When the liquid in the washer tank 60 is reduced and the liquid level is lowered, the float consequently moves downward inside the case 12 such that the magnet 26 approaches the bottom of the case 12. When the float 22 (magnet 26) reaches a predetermined position, the reed switch 18 is actuated by the magnetic force of the magnet 26, so that the minimum liquid level is detected.

The case may be in which a foreign substance is mixed in the liquid filled in the washer tank 60. If the foreign substance is heavier than the liquid (i.e., has a greater specific gravity) and enters the case 12, it may adversely affect the operation of the level warning switch. However, with the level warning switch 10 in accordance with the present invention, even a foreign substance that is mixed in the solution is prevented from entering the case 12.

That is, the heavy foreign substance, together with the liquid, flows into the cap 32 through the through-hole 46 provided in the cap 32. The liquid and the foreign substance which have entered through the through-hole 46 reach the liquid guide passage 40 formed by the trough portion 38. Since the bottom wall 38A of the trough portion 38 is formed in such a manner as to be gradually inclined downward from the central portion of the cap 32 toward the outer periphery thereof, the foreign substance gradually moves to either of the distal ends of the trough portion 38 (liquid guide passage 40) along the bottom wall 38A. Here, the arrangement is such that the openings at the distal ends of the trough portion 38 correspond to the communicating holes 42 of the case 12 and hence communicate with the outside of the case 12. The notches 44 formed at the distal ends of the side walls 38B of the trough portion 38 allow the liquid guide passage 40 to communicate with the inside of the case 12. Only the foreign substance that is heavier than the liquid is discharged to the outside of the case 12 through the through-hole 42, and only the appropriate liquid flows into the case 12 through the notches 44. In addition, even if the foreign substance tries to enter the case 12 through its communicating hole 42, since the trough portion 38 (liquid guide passage 40) is formed in such a manner as to be inclined downward, the foreign substance is prevented from entering the case 12.

Thus, with the level warning switch 10, even in cases where the foreign substance is mixed in the liquid, the foreign substance is prevented from entering the case 12, and the movement of the float 22 is not hampered. Accordingly, it is possible to detect the liquid level reliably.

In a case where the remaining amount of the liquid in the washer tank 60 is close to a minimum liquid level (line X in FIG. 2) and a large acceleration G has occurred due to a sudden acceleration or deceleration of the vehicle or high-speed turning thereof, the liquid level in the tank 60 becomes inclined.

Figure 2:
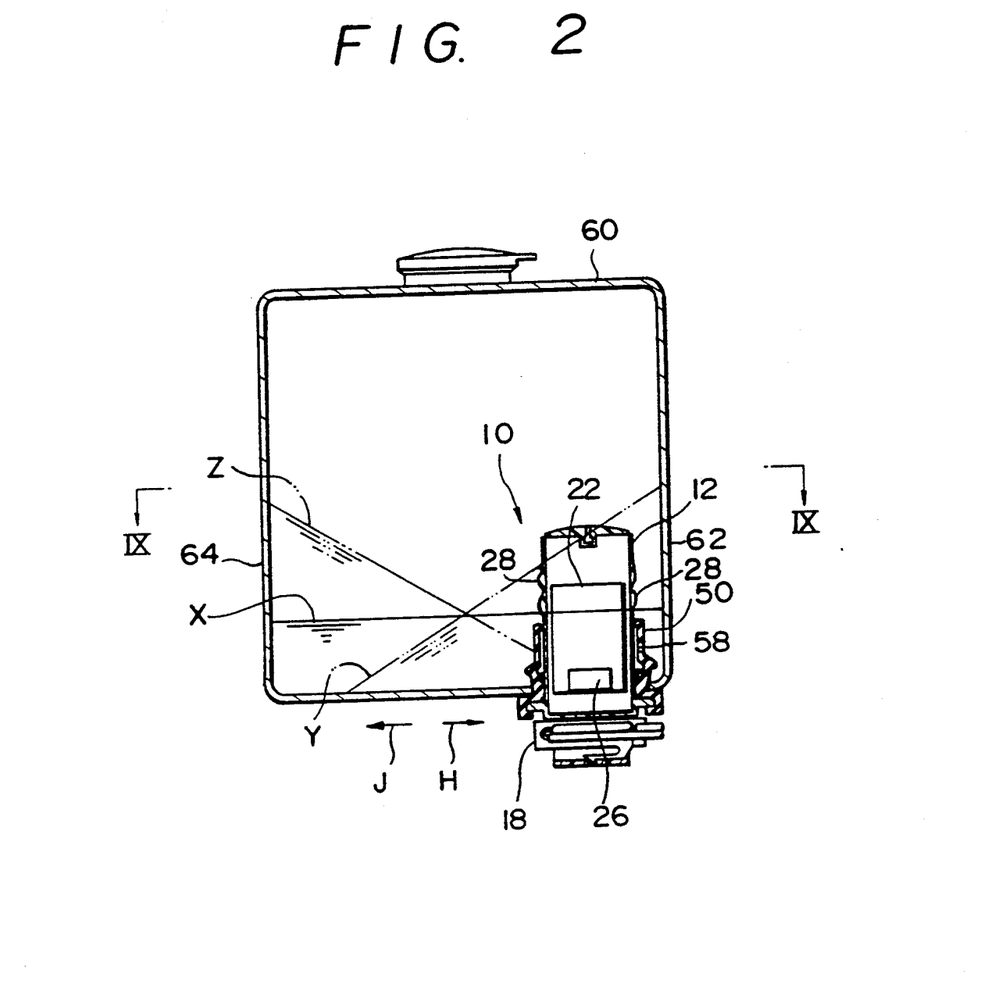
FIG. 2 is a cross-sectional view of a tank with the level warning switch, mounted therein.
Figure 3:
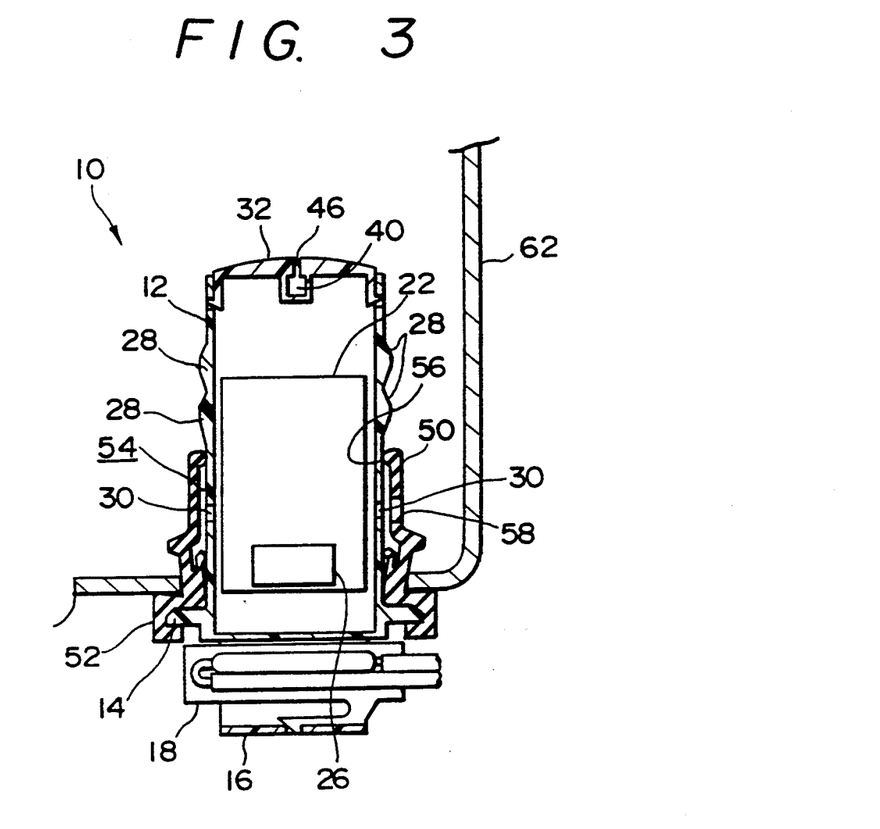
FIG. 3 is an enlarged view of essential portions of FIG. 2.

In this case, if, for instance, an acceleration has acted in a direction toward the inner surface of the side wall 62 of the tank close to the level warning switch 10 (in the direction of the arrow H in FIG. 2), the liquid moves in a biased manner toward the inner surface of the side wall 62, so that the liquid level becomes inclined (in the state of the line Y in FIG. 2). Here, since the through-hole 58 of the grommet 50 is provided in face-to-face relationship with the inner surface of the side wall 62 of the tank adjacent to the level warning switch 10, the inclined liquid level is located upwardly of the through-hole 58 of the grommet 50 (in other words, the through-holes 58 and 30 still remain immersed in the liquid). Accordingly, the liquid holding portion 54 formed by the case 12 and the grommet 50 as well as the case 12 remain filled with the liquid. As a result, the float 22 is prevented from moving downward. Accordingly, the reed switch 18 is prevented from being actuated unduly, so that "chattering" and "flickering" are prevented from occurring.

Meanwhile, in a case where an acceleration has acted in a direction toward an inner surface of a side wall 64 spaced apart from the level warning switch 10 (in the direction of the arrow J in FIG. 2), the liquid moves in a biased manner toward the inner surface of this side wall 64, so that the liquid level becomes inclined in an opposite direction to that in the above-described case (i.e., becomes inclined in the state of the line Z in FIG. 2). As a result, the liquid level is located downwardly of the through-hole 58 of the grommet 50 (in other words, the through-holes 58 and 30 are exposed from the liquid). In this case, however, since the acceleration acts in an opposite direction to the direction in which the liquid flows out through the through-hole 58 from the liquid holding portion 54 formed by the case 12 and the grommet 50 (i.e., inwardly of the grommet 50), the liquid is prevented from leaking from the liquid holding portion 54 to the outside. Consequently, the liquid also remains in the case 12 communicating with the liquid holding portion 54 by means of the through-hole 30, with the result that the float 22 is prevented from moving downward and is held inside the case 12 as it is. Accordingly, in this case as well, the reed switch 18 is prevented from being actuated unduly, so that "chattering" and "flickering" are prevented from occurring.

Thus, even in cases where the liquid in the washer tank 60 temporarily moves in a biased manner and the liquid level is inclined, the level warning switch 10 alone is capable of accurately ascertaining the remaining amount of the liquid (minimum liquid level). Hence, a detection circuit and the like using a timer become unnecessary, making it possible to reduce the production costs. In addition, since it is possible to detect the remaining amount of the liquid reliably without being affected by the configuration of the tank or the state of movement of the vehicle, the range of application of the level warning switch can be expanded.

Furthermore, with the level warning switch 10, since the protrusions 28 are formed around the outer periphery of the side wall of the case 12, the protrusions 28 serve as a stopper for preventing the level warning switch 10 from coming off.

Namely, at low temperatures in a cold wintertime, the liquid accommodated in tank 60 freezes and swells, thereby increasing the internal pressure of the washer tank 60. This typically has raised the possibility of the level warning switch coming off the washer tank 60. With the level warning switch 10 of the present invention, however, the liquid in the vicinity of the protrusions 28 of the case 12 becomes frozen and the case 12 becomes integral with the frozen portion of the liquid and is fixed as a stopper. Accordingly, even if the internal pressure of the washer tank 60 rises due to the freezing and swelling of the liquid, the level warning switch 10 is prevented from coming off the washer tank 60. It should be noted that, instead of the protrusions 28, annular or arcuate grooves may be provided around the outer periphery of the case 12, as a measure for preventing the case 12 from coming off by the freezing of the liquid located in the grooves and their vicinity. In addition, a similar advantage can be obtained if a plurality of projections are provided.

Figure 9:
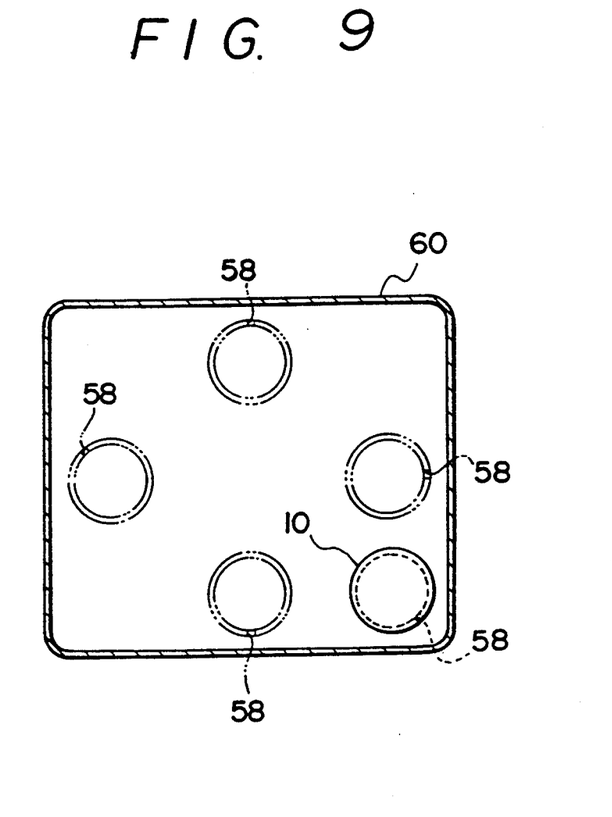
FIG. 9 is a schematic horizontal cross-sectional view taken along the line IX—IX of FIG. 2 and illustrates another state in which the level warning switch is disposed.

It should be noted that although in the above-described embodiment the arrangement provided is such that the through-hole 58 of the grommet 50 is provided in face-to-face relationship with the inner surface of the side wall 62 of the tank adjacent to the level warning switch 10, the through-hole 58 may not necessarily be disposed in alignment with a line perpendicular to the inner surface of the side wall 62. A similar advantage can be obtained by disposing the through-hole 58 within a 45 degrees angle with the inner surface of the side wall 62 of the washer tank 60, as shown on the left-hand side of FIG. 9.

In addition, in the above-described embodiment the level warning switch 10 is arranged to be mounted in proximity to the inner surface of only one side wall 62 of the washer tank 60. The present invention is not restricted to this arrangement, and the level warning switch 10 may be disposed at a corner of the tank (a bent angular portion defined between adjacent side walls), as shown at the lower right in FIG. 9, or may be disposed in a tank having a tank bent into a circular or elliptical configuration. In such a case, the range in which the through-hole 58 provided in the grommet 50 expands, so that the range of application of the level warning switch 10 increases further.

Furthermore, although in the above-described embodiment the grooves 24 are provided in the float 22 so as to guide the float 22, and the protrusions 20 are provided on the case 12, it goes without saying that the protrusions may be provided on the float 22 and the grooves on the case 12.

Moreover, although in the above-described embodiment the arrangement provided is such that the level warning switch 10 is applied to the washer tank 60, the level warning switch 10 may be applied to another type of tank such as a reservoir tank filled with a radiator liquid.

What is claimed is:

1. A liquid-level detecting structure for detecting a predetermined minimum level of a liquid, comprising:
   a housing disposed in a tank in close proximity to an inside wall surface of said tank, said housing having a flow passage provided through a wall of said housing for allowing liquid to flow into and out of said housing;
   a float disposed inside said housing and adapted to be moved by liquid which enters said housing;
   indicating means for indicating that said float is at a predetermined position corresponding to a predetermined level of liquid held in said tank; and
   means for retaining liquid in said housing when the level of liquid in said tank is higher than said predetermined minimum level and the liquid in the tank is at an inclination.

2. A liquid-level detecting structure according to claim 1, wherein said housing is mounted to said tank with a part of the housing inserted in an opening portion provided in said tank, and wherein at least one of a recessed portion and a protruding portion is provided on a portion of said outer peripheral wall surface of said housing so that said housing is prevented from coming off said tank when liquid held in said tank freezes.

3. A liquid-level detecting structure according to claim 1, wherein said means for retaining liquid comprises a side wall member disposed around an outer peripheral surface of said housing forming a liquid holding portion for holding liquid between said side wall member and said outer peripheral surface of said housing, said side wall member having a through hole facing said inside wall surface of said tank.

4. A liquid-level detecting structure according to claim 3, wherein said housing is mounted in an opening portion of said tank by a rubber mount, said mount having a cylindrical shape and being integral with said side wall member.

5. A liquid-level detecting structure according to claim 1, further comprising guide means for guiding said float during movement of said float in said housing, said guide means comprising a protrusion provided on one of said float and said housing and a groove provided in the other of said float and said housing for movably accommodating said protrusion.

6. A liquid-level detecting structure according to claim 1, wherein said housing is provided with a guide passage for guiding liquid into the interior of said housing and for preventing the entrance of a foreign substance heavier than the liquid into the interior of said housing.

7. A liquid-level detecting structure according to claim 6, wherein said guide passage has a bottom wall and side walls connected with said bottom wall, said bottom wall inclining downward from a central portion of said housing to the exterior of said housing, whereby said bottom wall and said side walls prevent the entrance of a foreign substance, heavier than liquid held in said tank, into the interior of said housing while allowing the liquid to enter the interior of said housing over said side walls.

8. A liquid-level detecting structure according to claim 1, wherein said housing is disposed at a corner portion of said tank.

9. A liquid-level detecting structure for detecting a predetermined minimum level of a liquid, comprising:
a housing disposed in a tank in close proximity to an inside wall surface of said tank;
a float disposed inside said housing and adapted to be moved by liquid which enters said housing;
a side wall member disposed around an outer peripheral wall surface of said housing and forming a liquid holding portion for holding liquid between said side wall member and said outer peripheral wall surface of said housing; and
indicating means for indicating that said float is at a predetermined position corresponding to a predetermined minimum level of liquid held in said tank;
wherein said housing has a first communicating passage in a wall thereof that communicates the inside of said housing with said liquid holding portion; and
wherein said side wall member has a second communicating passage that faces said inside wall surface of said tank so as to enable liquid held in said tank to flow into and out of said liquid holding portion, whereby liquid held in said liquid holding portion remains in said liquid holding portion when the level of liquid in said tank is higher than said predetermined minimum level and is at an inclination.

10. A liquid-level detecting structure according to claim 9, wherein said housing is mounted to said tank with a part of the housing inserted in an opening portion provided in said tank, and wherein at least one of a recessed portion and a protruding portion is provided on a portion of said outer peripheral wall surface of said housing so that said housing is prevented from coming off said tank when liquid held in said tank freezes.

11. A liquid-level detecting structure according to claim 10, wherein said housing is mounted in said opening portion of said tank by a rubber mount, said mount having a cylindrical shape and being integral with said side wall member.

12. A liquid-level detecting structure according to claim 9, further comprising guide means disposed between said float and said housing for guiding said float during movement of said float in said housing.

13. A liquid-level detecting structure according to claim 12, wherein said guide means comprises a protrusion provided on one of said float and said housing and a groove provided in the other of said float and said housing for movably accommodating said protrusion.

14. A liquid-level detecting structure according to claim 9, wherein said housing is provided with a guide passage for guiding liquid into the interior of said housing and preventing the entrance of a foreign substance heavier than the liquid into the interior of said housing.

15. A liquid-level detecting structure according to claim 14, wherein said housing comprises a cylindrical case with a bottom and a cover for covering an opening of said cylindrical case.

16. A liquid-level detecting structure according to claim 15, wherein said guide passage is provided in said cover.

17. A liquid-level detecting structure according to claim 9, wherein said housing is disposed at a corner portion of said tank.

18. A liquid-level detecting device for detecting a predetermined minimum level of a liquid in a tank, comprising
a housing having a flow passage, provided through a wall of said housing, communicating the interior and exterior of said housing for allowing liquid held in a tank to flow into and out of said housing;
a float disposed inside said housing and adapted to be moved by liquid which enters said housing; indicating means for indicating that said float is at a predetermined position corresponding to a predetermined level of liquid held in said tank; and
a cylindrical grommet adapted to surround an exterior surface of said housing and to mount said housing to an opening in a tank, said grommet having a side wall member that defines a liquid holding chamber between said side wall member and said exterior surface of said housing, said side wall member having a through hole communicating said liquid holding chamber and the exterior of said side wall member, wherein said grommet retains liquid in said housing when the level of liquid in the tank is higher than said predetermined minimum level and the liquid in the tank is at an inclination.

* * * * *